United States Patent
Ge et al.

(10) Patent No.: US 8,543,964 B2
(45) Date of Patent: Sep. 24, 2013

(54) CONSTRAINT OPTIMIZATION OF SUB-NET LEVEL ROUTING IN ASIC DESIGN

(75) Inventors: Liang Ge, Pudong New Area (CN); Xia Li, Pudong New Area (CN); Jia Lian Tang, Pudong New Area (CN); Xiao Feng Tang, Pudong New Area (CN); Chen Xu, Pudong New Area (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/280,146

(22) Filed: Oct. 24, 2011

(65) Prior Publication Data
US 2012/0110541 A1 May 3, 2012

(30) Foreign Application Priority Data
Oct. 29, 2010 (CN) .......................... 2010 1 0532083

(51) Int. Cl.
*G06F 17/50* (2006.01)
(52) U.S. Cl.
USPC .......................................... 716/134; 716/113
(58) Field of Classification Search
USPC ........................ 716/113, 126, 129, 130, 134
See application file for complete search history.

(56) References Cited

U.S. PATENT DOCUMENTS

| | | | |
|---|---|---|---|
| 7,181,712 B2 | 2/2007 | Mbouombouo et al. | |
| 7,363,607 B2 | 4/2008 | Birch et al. | |
| 7,689,964 B2 | 3/2010 | Zarkesh-Ha et al. | |
| 7,784,010 B1 | 8/2010 | Balsdon et al. | |
| 2006/0265678 A1* | 11/2006 | Okabe | 716/6 |
| 2007/0204255 A1 | 8/2007 | Narasimhan | |
| 2007/0234266 A1* | 10/2007 | Chen et al. | 716/13 |
| 2009/0259980 A1 | 10/2009 | Alpert et al. | |

* cited by examiner

*Primary Examiner* — Vuthe Siek
(74) *Attorney, Agent, or Firm* — DeLizio Gilliam, PLLC

(57) ABSTRACT

Functionality can be implemented for optimizing connection constraints in an integrated circuit design. A target timing path associated with a first of a plurality of sub-connections of the integrated circuit is determined. A timing probability value and a route probability value associated with the first of the plurality of sub-connections is determined based, at least in part, on the target timing path associated with the first of the plurality of sub-connections. The timing probability value indicates a probability that timing closure is satisfied on the target timing path. The route probability value indicates a probability that a physical routing track on the target timing path associated with the first of the plurality of sub-connections resolves congestion. A current connection constraint associated with the first of the plurality of sub-connections is modified in accordance with a connection constraint model to which the first of the plurality of sub-connections corresponds.

20 Claims, 10 Drawing Sheets

CONSTRAINT OPTIMIZATION OF SUB-NET LEVEL ROUTING IN ASIC DESIGN

RELATED APPLICATIONS

This application claims the priority benefit of Chinese Patent Application No. 201010532083.0 filed Oct. 29, 2010.

BACKGROUND

1. Technical Field

Embodiments of the inventive subject matter generally relate to the design of an integrated circuit (IC) chip, and more specifically, to optimizing connection constraints in an integrated circuit design.

2. Description of the Related Art

Typically, large scale integrated circuits contain millions of logic gates. FIG. 1 shows the spatial structure of an existing IC chip, the bottom of the chip is a base layer consisting of transistors and the upper layer is a metal layer consisting of metal connections.

In the design process of an integrated circuit, the first step is register transfer level (RTL) coding. The RTL coding is then encoded into a gate-level netlist containing devices and connections of chips by an IC design tool, such as a Synopsys® Design Compiler® tool. The process of encoding the RTL coding into a gate-level netlist may be referred to as synthesizing. Finally, operations for placement of chip devices and connecting the chip devices (also referred to as routing, wiring or lining) are performed.

Based on the connection, the IC design tool will provide connection constraints before connecting, where the connection constraints include the length of the connection, the number of the metal layer at which the connection is located, and the width of the connection. In this manner, the IC design tool can automatically perform connections for the whole design in accordance with the requisite connection constraints. If the connection resource provided by a metal layer in a certain region of a chip (e.g., the amount of metal area required to create the requisite connections), is less than the requisite connection resource, the region of the chip is deemed to suffer from "congestion" or is deemed to be "congested." Generally, a congestion matrix, a list of congestion values associated with different regions on the chip, or a congestion map can be used to describe the severity of the congestion and the position/location of the congestion on the chip.

Back-end design of a general-purpose integrated circuit chip typically comprises two processes—timing closure and physical closure. Timing closure can refer to the process for ensuring that all the logical units in a circuit satisfy their corresponding predetermined timing requirements. The predetermined timing requirements can comprise setup time and hold time determined from a digital logic unit design library and/or other suitable timing requirements (e.g., based on the actual application) indicated by chip front-end developers. It is noted that if the predetermined timing requirements cannot be satisfied, the chips may not operate reliably (e.g., execute their logic operations as intended) at a predetermined temperature and voltage. Physical closure can refer to the process for ensuring that all the layout wirings on the chip satisfy a set of predetermined parameters known as Design Rule Checks (DRC). These design rules can be used to check whether all the logic connections are associated with corresponding connections at the physical level and whether the connection constraints are satisfied. It is noted that if the design rule checks are not satisfied, short circuits, open circuit, and other such connection errors can occur in the chips, causing malfunctioning (or unreliable operation) of the chips.

Optimization processes are executed to ensure that the integrated circuit design satisfies the timing requirements for timing closure. The optimization processes include changing the gate area of a digital logic unit to vary the driving capability of the logic unit and/or to vary the delay associated with the logic unit. The optimization processes also include recombining the structure of a buffer or a buffer tree, inserting buffer trees to build and optimize a clock tree, inserting buffer units to satisfy constraint requirements associated with transmission time and load of physical wires, inserting buffer units to satisfy constraint requirements associated with hold time or setup time, inserting one or more additional logic units, etc. Inserting the additional logic units serves to increase the metal layer (generally the lower metal layer associated with the highest wiring density) occupied by the logic units. The new logic connections as a result of the additional logic units consumes additional wiring resources because A) the length of the original metal wires may be increased because of the additional buffer units (e.g., because of a change in the wiring direction), and B) the pin connections of the additional logic units require additional metal vias (i.e., vertical electrical connection between different layers). Thus, the optimization processes to ensure timing closure result in a decrease in the amount of available wiring resources, additional problems because of the added metal wires and metal vias, and an increase in the amount of time to further optimize the wiring resources.

Typically, one or more metal layers and metal vias are changed to ensure that the chip satisfies the DRC for physical closure. However, the changes made to the metal layers and metal vias may directly affect (e.g., increase or decrease) the length of the original metal wires. This can result in a variation in the parameters (e.g., resistance and capacitance) of the metal wires, which in turn can result in a variation in the signal transmission time and in the delay. These changes (e.g., an increase or a decrease in the signal transmission time, the delay, etc.) can affect the timing closure, especially in the regions of the chip where the wiring resources are limited and where it is difficult to change the metal layers and metal vias. In the regions of the chip that are associated with limited wiring resources, a slight change in one part of the region can affect the entire design of the chip. To obtain more wiring resources, some metal connections may have to bypass the regions where the wiring resources are limited. This may increase the length of the original metal wire and may even result in additional metal layers and metal vias. This increase a can further affect the parameters (e.g., resistance and capacitance) of the metal wires which, in turn, can result in a variation in signal transmission time and delay. Thus, the process for ensuring physical closure, especially in the regions where the wiring resources are limited, can result in a variation of the signal transmission time and the delay on the wire which, in turn, can influence the timing closure.

SUMMARY

In existing integrated circuit design, connection constraints are typically set on connections. At the connection level, the connection constraints typically comprise a mix of timing constraints and congestion constraint. However, it can be difficult for existing electronic design tools to balance the two constraints. Embodiments provide a novel method and system for optimizing connection constraints for IC design. The designed connection constraints can be optimized based on timing and congestion by setting the connection constraints, so that the resultant integrated circuit has a fewer number of congestion regions while satisfying the timing constraints.

Various embodiments for optimizing connection constraints in an integrated circuit (IC) design are disclosed. In some embodiments, a target timing path associated with a first of a plurality of sub-connections of the integrated circuit is determined. The first of the plurality of sub-connections is associated with a current connection constraint set. A timing probability value associated with the first of the plurality of sub-connections is determined based, at least in part, on the target timing path associated with the first of the plurality of sub-connections. The timing probability value indicates a probability that timing closure is satisfied on the target timing path associated with the first of the plurality of sub-connections. A route probability value associated with the first of the plurality of sub-connections is determined based, at least in part, on the target timing path associated with the first of the plurality of sub-connections. The route probability value indicates a probability that a physical routing track on the target timing path associated with the first of the plurality of sub-connections resolves congestion. A connection constraint model to which the first of the plurality of sub-connections corresponds is identified based, at least in part, on the timing probability value associated with the first of the plurality of sub-connections and the route probability value associated with the first of the plurality of sub-connections. The current connection constraint associated with the first of the plurality of sub-connections is modified in accordance with the connection constraint model to which the first of the plurality of sub-connections corresponds.

BRIEF DESCRIPTION OF THE DRAWINGS

The objects, features and advantages of the embodiments will become more apparent by with reference to the attached drawings and the description below describing in more detail example embodiments, in which the same reference numerals generally represent the same parts in the example embodiments.

DESCRIPTION OF EMBODIMENT(S)

Embodiments will be described in more detail with reference to the accompanying drawings. Embodiments may, however, be embodied in various other forms and should not be construed as limited to the embodiments set forth herein. Rather, these embodiments are provided so that the disclosure is more thorough and complete, and will fully convey the scope of the disclosure to those skilled in the art.

Typically, an integrated circuit design can be deemed to be successful when both timing closure and physical closure are simultaneously achieved. During the design process, timing analyses can be carried out to ascertain whether the timing of the IC being designed is closed (e.g., whether timing closure is achieved). Typically, the timing analysis is relatively coarse at the start of the IC design cycle and becomes finer/closer to the timing of a real IC towards to the end design cycle. However, each at each step in the design process (e.g., as additional logic units are added to the design), the timing analyzed in the previous step may be affected, and hence the design of an IC becomes an iterative process.

In some embodiments, the influence of wiring process on the timing can be considered. In other words, in some embodiments, the timing constraints can be determined so that the wiring process has a minimum influence on the timing and so that timing closure and physical closure can be easily and quickly achieved.

Figure 1:
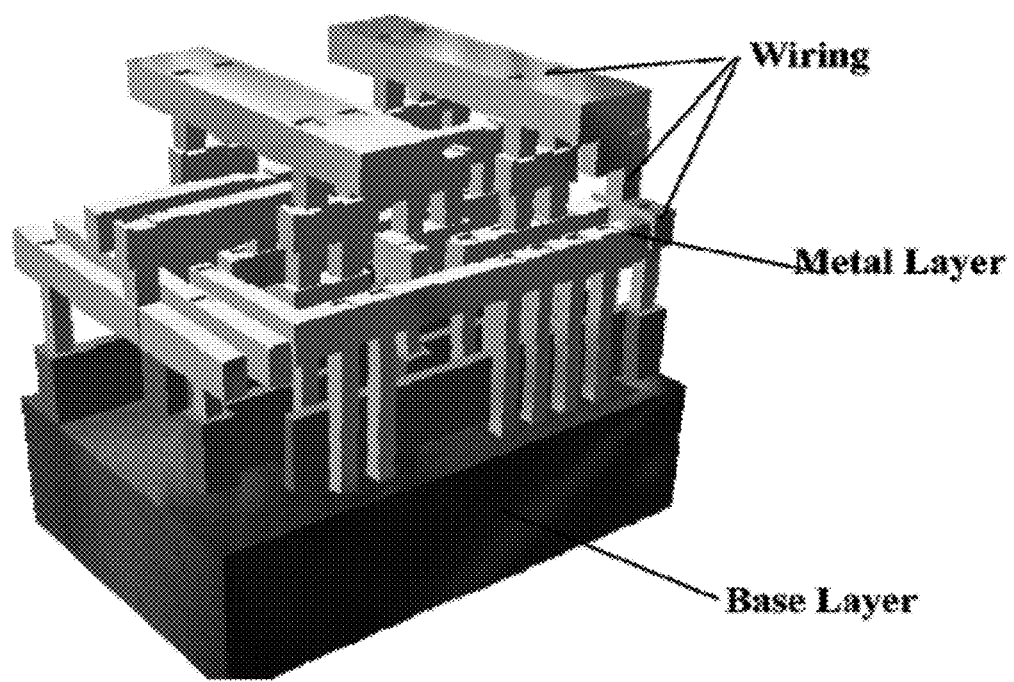
FIG. 1 shows the spatial structure of an existing IC chip.
Figure 2:
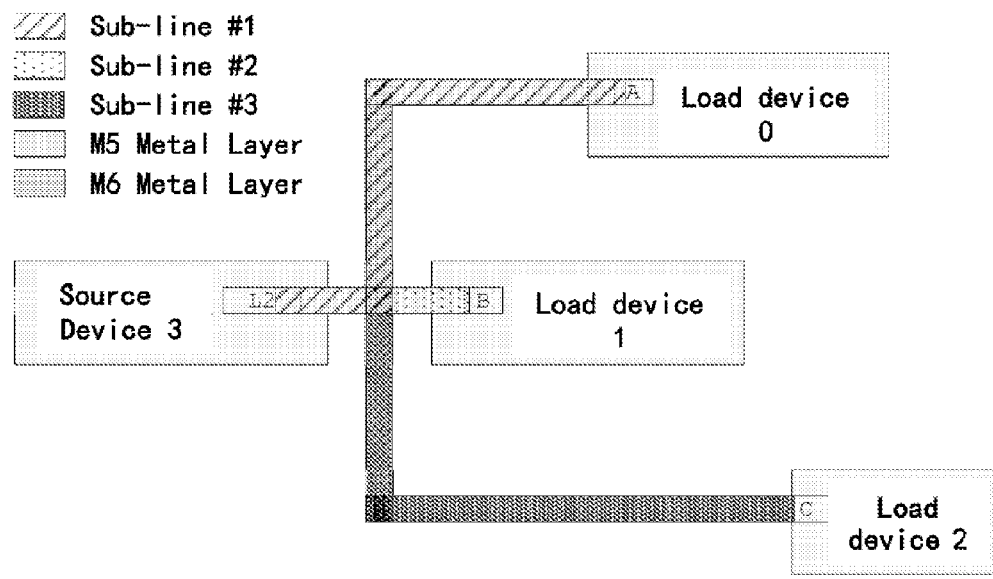
FIG. 2 shows a schematic view of connection constraints set for a portion of circuits by an existing IC design tool.

FIG. 2 shows a schematic view of a connection constraints set for a portion of the circuit as determined by an existing IC design tool. The portion of the circuit depict three sub-connections from an output terminal of a source device 3 (e.g., of a previous stage) to an input terminal of load device 0, load device 1, and load device 2 respectively (e.g., of a next stage). The connection constraints associated with the three sub-connections are set by the existing IC design tool so that the connection constraints for the three sub-connections are the same. In other words, the existing IC design tool can determine that the three sub-connections should have approximately the same line-widths and should be positioned at the fifth metal layer (M5) or the sixth metal layer (M6). However, all the three sub-connections may not be timing critical. For example, only one of the three sub-connections may be timing critical, while the other two sub-connections may have a sufficient timing margin. With reference to FIG. 2, only the first output to the next stage (i.e., load device 0) may be a timing critical path, and the other two paths (i.e., associated with load device one and load device 2) may not be timing critical. In this example, applying the connection constraints associated with the timing critical path to the paths that are not timing critical can result in additional connection resources being consumed.

Figure 3:
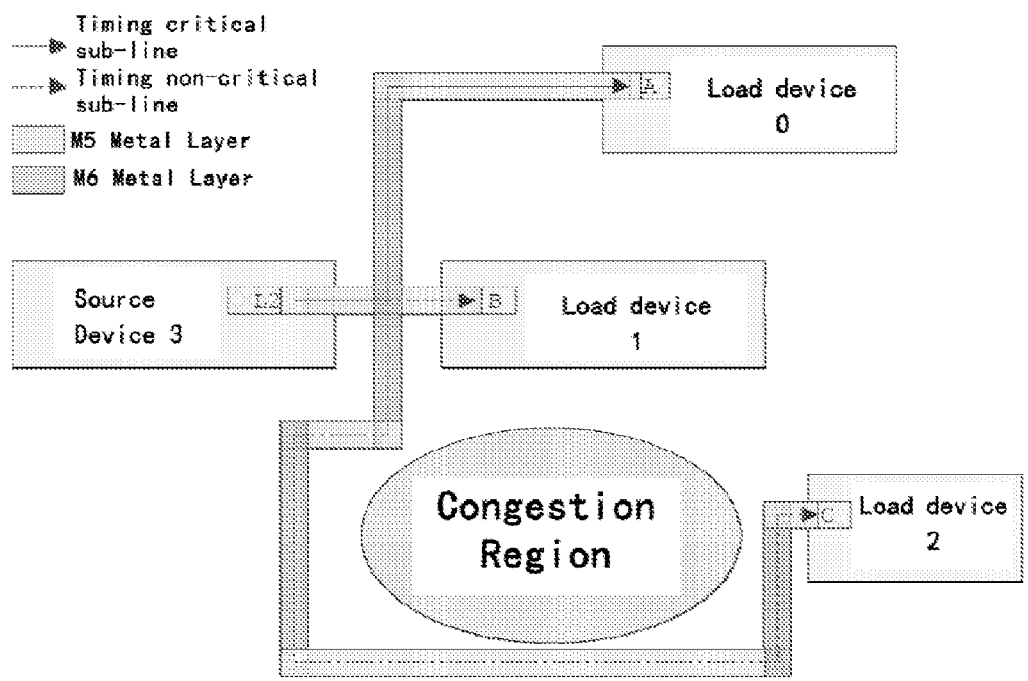
FIG. 3 shows an example in which connection is too long due to a congestion region existing in a path of an output at the next stage.

In some embodiments, as depicted in FIG. 3, a congestion region may exist in the path between a source device (e.g., the source device 3) and a load device (e.g., the load device 2). In this embodiment, the path to the load device 2 (or the third output of the next stage) may be designed to bypass the congestion region in accordance with the connection constraints set by the existing IC design tool. This can cause the connection between the source device 3 and the load device 2 to become lengthy, as depicted in FIG. 3. As described above, the path between the source device 3 and the load device two may not be critical and the timing associated with this path may satisfy the timing constraints (even though the length of the path was increased). However, the bent wiring (along the path between the source device 3 and the load device 2) can consequently the increase the length of the path can increase the parameters (e.g., resistance and capacitance) associated with the path. This, in turn, can increase the signal transmission time. In some implementations, the previously non-timing critical path (between the source device 3 and the load device 2) may become a timing critical path, resulting in violation of the timing requirements and the connection constraints set by the existing IC design tool.

As described above, the connection constraints set by the existing IC design tool may not be able to balance timing and therefore, may be unable to reduce the congestion regions. With reference to the stringent connection constraints of FIG. 2, it is noted that in the present invention, the non-critical timing paths are connected at the lower metal layer by maintaining the line-width of the connection to the first output (load device 0) of the next stage and the number of the metal layer on which the connection is located. Some of the connection resources (e.g., the wiring resources) can be released by using thinner line-width, which can relax the connection constraints. Therefore, with reference to the stringent connection constraints of FIG. 2, the connection constraints can be relaxed by reducing the width of the connections and selecting different metal layers, as shown in FIG. 3.

Some embodiments provide a method for optimizing connection constraints in an integrated circuit (IC) design. In some embodiments, each sub-connection may be associated with a corresponding connection constraint. For example, FIG. 2 includes three sub-connections and each of the three sub-connections are associated with a corresponding connection constraint. Thus the effect of the connection constraints becomes smaller; as for each sub-connection, different constraints can be set based on the timing requirements of sub-connections thereof. In some implementations, the connection constraints associated with each sub-connection can be determined based on existing IC design tools and can then be modified in accordance with operations described herein.

In some embodiments, each of the sub-connections (which may be also referred to as sub-lines) may be classified into one of four categories. A first category of sub-connections can comprise those that are timing critical and difficult to route, a second category of sub-connections can comprise those that are timing critical and easy to route, a third category of sub-connections can comprise those that are non-timing critical and difficult to route, and a fourth category of sub-connections can comprise those that are non-timing critical and easy to route.

In some embodiments, the connection constraints associated with each of the four categories of sub-connections can be modified differently, as described below. For example, modification operations may not be executed for the first category of sub-connections and the fourth category of sub-connections. In other words, the original connection constraints associated with the first category of sub-connections and the fourth category of sub-connections may not be modified. For the second category of sub-connections, the line-width of routing may be increased so that the routing is placed on a metal layer at a higher level. For the third category of sub-connections, the line-width of routing may be decreased so that the routing is placed on a metal layer at a lower level.

In some implementations, sub-connections belonging to the first category of sub-connections may be affected after the connection constraints associated with the second and third categories of sub-connections are modified. Therefore, in some implementations, the first category of sub-connections may be corrected after (and based on modifications made to) the second and/or the third categories of sub-connections. As described above, the fourth category of sub-connections simultaneously satisfy timing closure and physical closure and therefore, their corresponding connection constraints need not be modified. For the second category of sub-connections, the routing is placed on a metal layer at a higher level by increasing the line-width of the routing to facilitate the timing closure. For the third category of sub-connections, the routing is placed on a metal layer at a lower level by decreasing the line-width of the routing to lower the requirements for routing resources (e.g., to minimize congestion).

In some implementations, a timing close probability (TP) parameter and a route probability (RP) parameter can be determined to classify a sub-connection into one of the four categories of sub-connections. Before determining the TP parameter and the RP parameter of a sub-connection, a target timing path of the sub-connection can be determined. The TP parameter relates to a possibility (and indicates the probability) that a timing closure holds on the target timing path where the sub-connection is located. The RP parameter relates to a possibility (and indicates the probability) that a physical routing track on the target timing path where the sub-connection is located resolves a congestion problem. The TP parameter and the RP parameter constitute a two-dimensional TP-RP parameter space. For any sub-connection, if the specific values of the TP parameter and the RP parameter can be calculated, the position of the parameters of the sub-connection in the two-dimensional TP-RP parameter space can be determined. In the two-dimensional TP-RP parameter space, different sub-connections are located at different positions, corresponding to the category (described above) to which the sub-connections belong.

Figure 4:
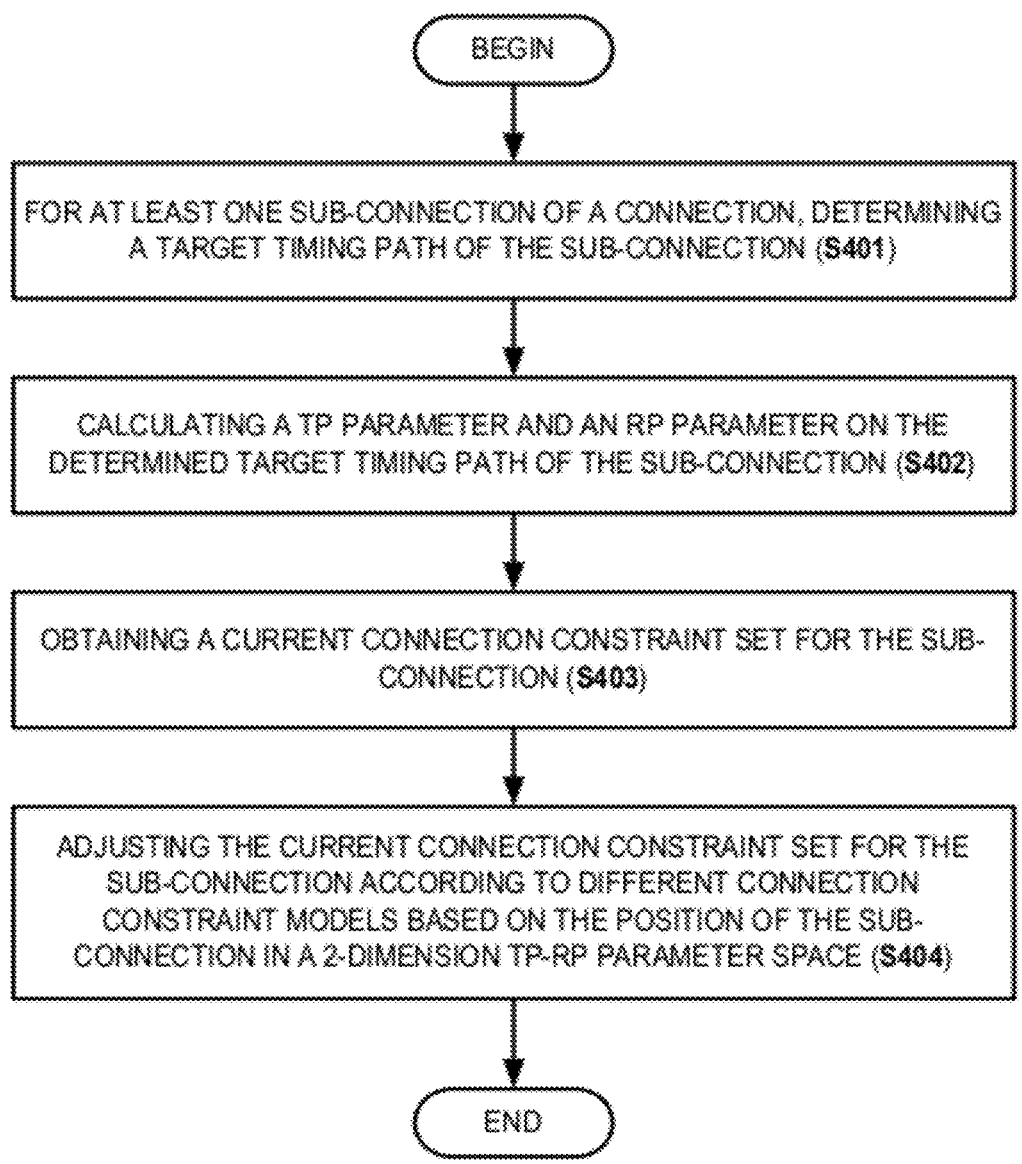
FIG. 4 shows a flow chart of a method of optimizing connection constraints in an IC design.

Thus, a method for optimizing connection constraints in an IC design according to some embodiments is shown in the flow chart of FIG. 4. At step S401, for at least one sub-connection of a connection, a target timing path of the sub-connection is determined. At step S402, TP parameter and RP parameter on the determined target timing path of the sub-connection are calculated. The TP parameter relates to a possibility that the timing closure holds on the target timing path where the sub-connection is located. The RP parameter relates to a possibility that a physical routing track passing on the target timing path where the sub-connection is located resolves a congestion problem. At step S403, a current connection constraint set for the sub-connection can be determined using a suitable existing IC design tool. At step S404, the current connection constraint set (determined at step S403) of the sub-connection can be adjusted according to the different connection constraint models set based on the position of the sub-connection in the two-dimensional TP-RP parameter space. It is noted that the step S403 may be executed prior to or following the steps S401 and S402. Step S404 may be executed after the steps S401, S402, and S403 are executed.

Figure 5:
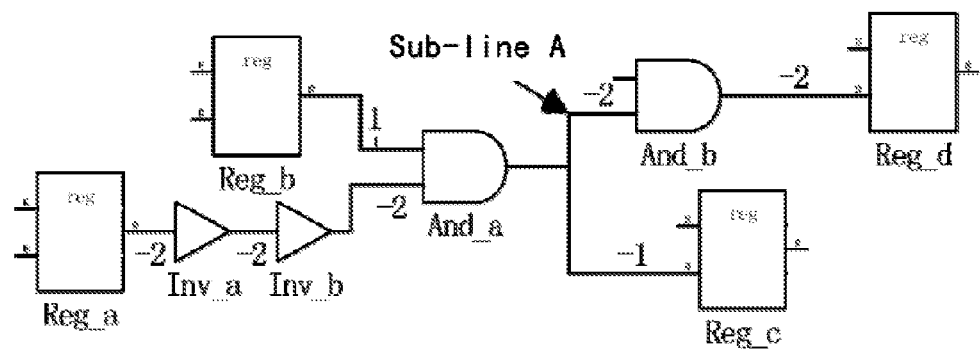
FIG. 5 shows connection relationships between devices in a portion of designed ICs.

Determining the result of the target timing path can depend on the structure of the netlist (associated with the IC design) and design constraints. Once the structure of netlist and the design constraints are determined, the corresponding relationship between the sub-connection and the target timing path can be determined. In some embodiments, target timing path of a sub-connection can be determined by considering connection relationships of between devices in a portion of IC design as shown in the example of FIG. 5. The numeric value labeled on each connecting line (between individual components) in FIG. 5 represents a timing closure degree associated with a current connecting point. The timing closure degree can be calculated as a difference between a required arrival time (referred to as "required AT") and an arrival time ("AT") of the current connecting point. This value is typically less than or equal to a timing closure degree associated with a located timing path. If the timing closure degree of the current connecting point is greater than 0, this can indicate that the timing of the current connecting point is closed. If the timing closure degree associated with the current connecting point is less than 0, this can indicate that the timing of the current connecting point is not closed. For example, with reference to sub-line A, all the timing paths associated with sub-line A can first be determined. In FIG. 5, the two timing paths that comprise the sub-line A are:

Reg_a→Inv_a→Inv_b→And_a→And_b→Reg_d; and
Reg_b→And_a→And_b→Reg_d.

For each of the two identified timing paths, a timing closure degree associated with the timing paths can be calculated. Next, timing closure degrees of all the current connecting points on each of the timing paths (that comprise the sub-line A) can be algebraically added to obtain a closure degree value of each timing path. The timing path associated with the smallest timing closure degree value can be selected as the target timing path of the sub-line A. In the above two timing paths, the closure degree value associated with the first timing path is −10, and the closure degree value associated with the second timing path is −3. Thus the first timing path can be selected as the target timing path.

In addition, the target timing path of the sub-line can be also determined by using timing closure degree values of data transmitting points and data receiving points. The timing check points can be data storage devices such as Reg (e.g., Reg_a, Reg_b, Reg_c, Reg_d) in FIG. 5. For the sub-line A in FIG. 5, data receiving points at which data is received via the sub-line A are identified and the one with the minimum timing closure degree is identified. In FIG. 5, Reg_d is identified as the data receiving point. Data transmitting points from which all the data is transmitted via the sub-line A are identified. In FIG. 5, Reg_a and Reg_b can be selected as data transmitting points. The data transmitting point with the smallest timing closure degree can be selected. Accordingly, the timing path of the sub-line A can be determined as Reg_a→Inv_a→Inv_b→And_a→And_b→Reg_d or Reg_b→And_a→And_b→Reg_d depending on whether Reg_a or Reg_b respectively was associated with the smaller timing closure degree.

Both the TP parameter and RP parameter can be calculated based on a target timing path of a sub-connection. Various techniques can be employed for determining the TP parameter. In one example, as shown in FIG. 5, the TP parameter can be determined based on the device connection relationships of a portion of the designed integrated circuits. After a target timing path on which each of the sub-connections is located is identified, values of the TP parameters can be obtained in accordance with values of timing closure degrees checked at different timings. As another example, other suitable techniques can be employed to determine the TP parameters in accordance with values of timing closure degrees checked at different timings, as will be described below.

In one example, a setup check timing closure degree value on the determined target timing path of the sub-connection can be used as TP parameter value of the sub-connection, that is, $$\text{setup slack} = \text{clock arrival time} + \text{clock adjust} - \text{data arrival time} - \text{guard time} \quad (1)$$

$$TP = \text{setup slack} \quad (2)$$

wherein, the setup slack can be a setup check timing closure degree value on the target timing path where the sub-connection is located, the clock adjust can be a clock period determined based on frequency, the data arrival time can be the data arrival time on the target timing path where the sub-connection is located, and the guard time can be a time margin for ensuring normal operation of a device. The guard time can be defined in the device model library. The setup slack, the clock adjust and, the data arrival time can be calculated using a timing analysis tool, a common timing analysis method in digital IC designs.

As another example, a weighted average of a setup check timing closure degree value on the determined target timing path of the sub-connection and a hold check timing closure degree value can be used as a TP parameter value. In other words, $$\text{hold slack} = \text{data arrival time} - \text{guard time} - \text{clock arrival time} - \text{clock adjust} \quad (3)$$

$$TP = \text{setup slack} * C + \text{hold slack} * (1-C) \quad (4)$$

wherein, the hold slack can be a timing closure degree value of hold time check on the target timing path on which the sub-connection is located. The hold slack can be calculated by a timing analysis tool. "C" is a constant that may be determined previous analysis, the designer's experiences, etc.

As another example, a sum of a setup check timing closure degree value on the determined target timing path of the sub-connection and a reciprocal of a logical level on the target timing path can be used as a TP parameter value. In other words, $$TP = \text{setup slack} + C * (\text{level})^{-1} \quad (5)$$

wherein, the level can be a logical level on the target timing path on which the sub-connection is located. The level can be calculated by a timing analysis tool. "C" is a constant that may be determined previous analysis, the designer's experiences, etc.

As another example, the difference between a late time and an early time on the determined target timing path of the sub-connection can be used as a TP parameter value. In other words, $$TP = AT(\text{late}) - AT(\text{early}) \quad (6)$$

wherein, AT(late) can be a late time on the target timing path on which the sub-connection is located and AT(early) can be an early time on the target timing path on which the sub-connection is located. AT (late) and AT (early) can be calculated by a timing analysis tool.

It is noted that several other methods obvious to one skilled in the art may be employed for determining the TP parameter and these methods fall within the scope of the embodiments. Thus, the TP parameter on the target timing path on which the sub-connection is located can be obtained by using any one of the above methods.

Figure 6:
FIG. 6 shows a congestion region.

After the target timing path associated with each of the sub-connections is determined, the RP parameter can be calculated. Various techniques can be employed for determining the RP parameter. In one example as depicted in FIG. 6, the RP parameter can be determined based on congestion regions. As depicted in FIG. 6, prior to calculating the RP parameter, the congestion regions (through which the sub-connection passes) are divided into a grid comprising a predetermined number of "blocks" with a predetermined size (e.g., the grid as shown in FIG. 6 comprising 12 blocks). Each of the blocks in the grid can be marked with a congestion degree based on the number of routes passing through. The congestion degree of the grid can be determined using existing congestion analysis tools. Generally, these congestion analysis tools can determine the congestion degree of the grid based on a physical side length (TW) of the grid and the size of the connection passing through the grid region, including the width (NW) of the connection and a physical minimum pitch between the connections.

$$Con_i = \frac{\sum_{j=0}^{n} NW_j + \sum_{j=0}^{n-1} Pitch_{j,j+1}}{TW} \quad (7)$$

In particular, if the width of the grid is 11 μm, the minimum width of the connection is 1 μm, and the minimum allowable pitch between connections is 1 μm, then it can be determined that a maximum of six connections with minimum widths can exist in this congestion region. If the congestion region comprises four connections with the minimum widths and the minimum allowable pitch, the congestion degree can be determined to be 7/11=63.63%.

The congestion degree value of each block of the grid can be used to calculate the RP parameter on the target timing path on which each sub-connection is located. Various techniques can be employed for determining the RP parameter, some of which are discussed below.

In one implementation, the blocks of the grid through which a sub-connection passes can be identified. The squared difference of the congestion degree values (of the identified blocks in the grid) that are greater than a threshold (A) can be designated as the RP parameter as indicated by equation 8.

$$RP = \sum_i [\max(Con_i, A) - A]^2 \quad (8)$$

$Con_i$ can be a congestion value of a block in the congestion region through which each sub-line passes, which can be a relative value. The congestion values shown in FIG. 6 can be all linearized to integers between 0-100. For example, if the threshold is set to be 80 (i.e., if A=80), the RP parameter of a sub-line 1 between the source device and the load device 0 is 254, and the RP parameter of a sub-line 2 between the source device and the load device 1 is 1164.

In another implementation, the congestion value of the most congested block (in the grid) through which the sub-connection passes can be designated as the RP parameter associated with the sub-connection. With reference to the example of FIG. 6, the RP parameter of the sub-line 1 between the source device and the load device 0 is 95, and the RP parameter of the sub-line 2 between the source device and the load device 1 is 105.

In another implementation, the sum of congestion values of blocks contained in a rectangle, with an input terminal and an output terminal through which the sub-connection passes as vertices, can be designated as the RP parameter of the sub-connection. In this case the RP parameter of the sub-line 1 between the source device and the load device 0 is 177, and the RP parameter of the sub-line 2 between the source device and the load device 1 is 367.

It is noted that several other methods obvious to one skilled in the art may be employed for calculating the RP parameter and these methods fall within the scope of the embodiments.

As described above, the TP parameter and the RP parameter constitute a two-dimensional space. As described above in step S404 of FIG. 4, the current connection constraint associated with at least one sub-connection can be modified in accordance with different connection constraint modification strategies. The connection constraint modification strategies are determined based on the TP parameter and the RP parameter of the target timing path of the sub-connection (and the position of the sub-connection) in the two-dimensional TP-RP parameter space. The two-dimensional TP-RP parameter space can be divided into multiple sections using various techniques.

In one embodiment, the two-dimensional TP-RP parameter space can be divided using a hyperbola.

$$Ci = (RP - RP0)*(TP - TP0) \quad (9)$$

Figure 7:
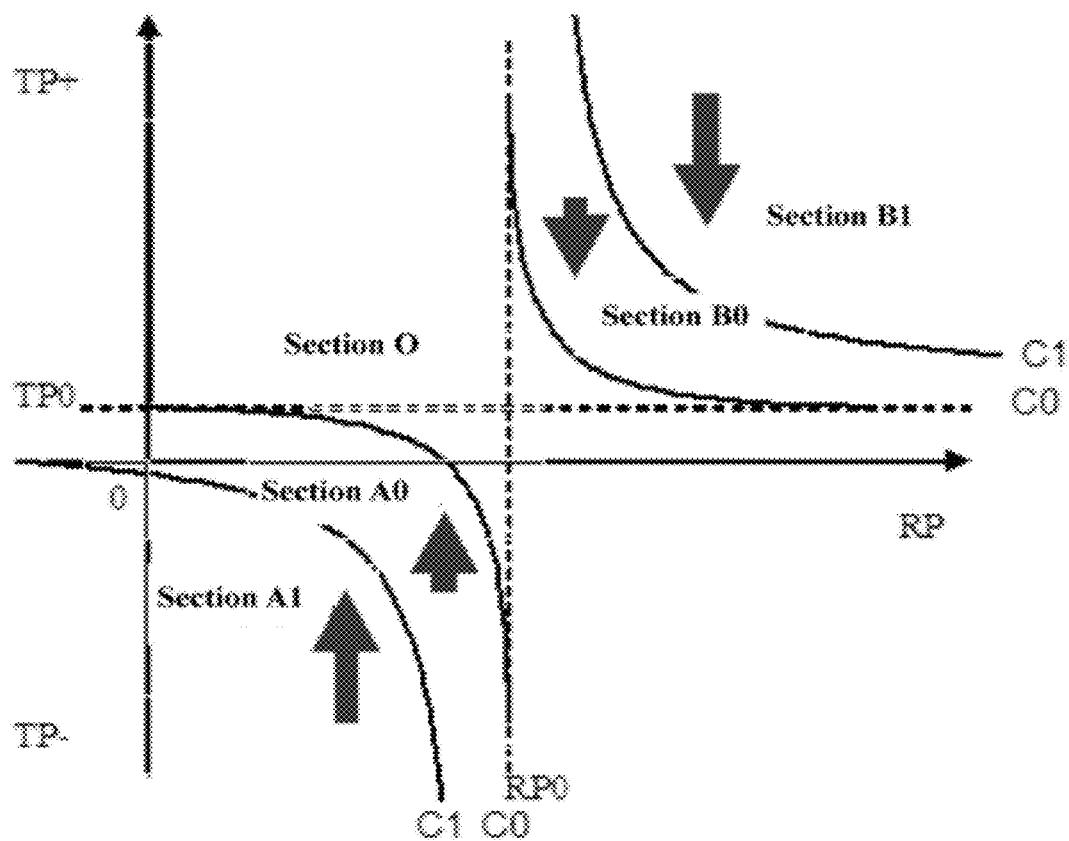
FIG. 7 shows a hyperbolic division chart in a two-dimensional RP-TP parameter space.

FIG. 7 shows a hyperbolic division chart of a two-dimensional TP-RP parameter space. C0 and C1 are two thresholds determined using Eq. 9. Two sets of hyperbolas can be obtained by using the two thresholds. The two hyperbolas divide the TP-RP parameter space into five sections: section A0, section A1, section B0, section B1 and section O. The two-dimensional TP-RP parameter spaces occupied by each of the five sections are shown in Table 1.

TABLE 1

Two-dimensional RP-TP parameter spaces occupied by each section

| Region | C | RP, TP |
|---|---|---|
| A1 | [C1, +∞) | RP < RP0 & TP < TP0 |
| A0 | [C1, C0) | |
| O | (−∞, C0) | RP < RP0 & TP > TP0 |
| | | RP > RP0 & TP < TP0 |
| B0 | [C0, C1) | RP > RP0 & TP > TP0 |
| B1 | [C1, +∞) | |

The connection constraint model can be considered as follows for the above TP-RP parameter space dividing method.

The sub-lines located in the sections A0, A1 correspond to the aforementioned second category of sub-lines, which do not have a routing problem, but which have timing problems (e.g., where it is difficult to close the timings). The timing problems associated with the sub-lines in section A1 may be more severe than that the timing problems associated with the sub-lines in section A0. Therefore, the sub-lines in the section A1 may have a larger line-width and may be located on a metal layer at a higher level.

The sub-lines located in the sections B0, B1 correspond to the aforementioned third category of sub-lines, which do not have a timing problem, but which have a routing problem (e.g., the sub-lines pass through congestion regions). The routing problems associated with the sub-lines in section B1 may be more severe as compared to the routing problems associated with the sub-lines in section B0. Therefore, the sub-lines in section B1 may have a narrower line-width and may be located on a metal layer at a lower level.

The sub-lines located in the upper-left corner of the section O correspond to the fourth category types of sub-lines, and therefore, the connection constraints associated with these sub-lines may not be modified.

The sub-lines located in the lower-right corner of the section O correspond to the first category of sub-lines, wherein the timing closure problem and the routing congestion problem exist simultaneously. It is typically not feasible to sacrifice one constraint (e.g., either the routing or the timing) to satisfy the other. The connection constraints associated with the sub-lines in the first category may not be modified. The timing and the routing of these sub-lines may be indirectly optimized by optimizing the other sub-lines with no routing congestion problems located in the same path (e.g., in the sections A0 and A1), and optimizing the sub-lines with no timing closure problem located in the same region (e.g., in the sections B0 and B1).

In some embodiments, all the connection constraint models may be based on existing electronic design automation (EDA) tools. Therefore, in step S403 of FIG. 4, a current set of connection constraints for a sub-line under consideration using may be determined using the existing IC design (or EDA) tool and the current set of connection constraints may be modified using operations described herein. The TP-RP parameter space dividing method can also be used to control wiring widths and metal layers of a sub-net. The wider wiring widths and a higher level metal can reduce the delay associated with a wire and accelerate the part of circuit that comprises the wire. This is because the value C (calculated in accordance with equation 9) associated the wire falls within the region that is associated with tight timing but sufficient wiring space (e.g., in the lower-left of the graph C0 of FIG. 6). On the contrary, a narrow wiring width and a lower level metal layer can be used to decrease wiring congestion and slow down the corresponding part of circuit. This is because the value C associated with the wire falls within the region with wiring congestion but with relaxed timing constraints (e.g., in the upper-right of the graph C0 of FIG. 6).

Figure 8:
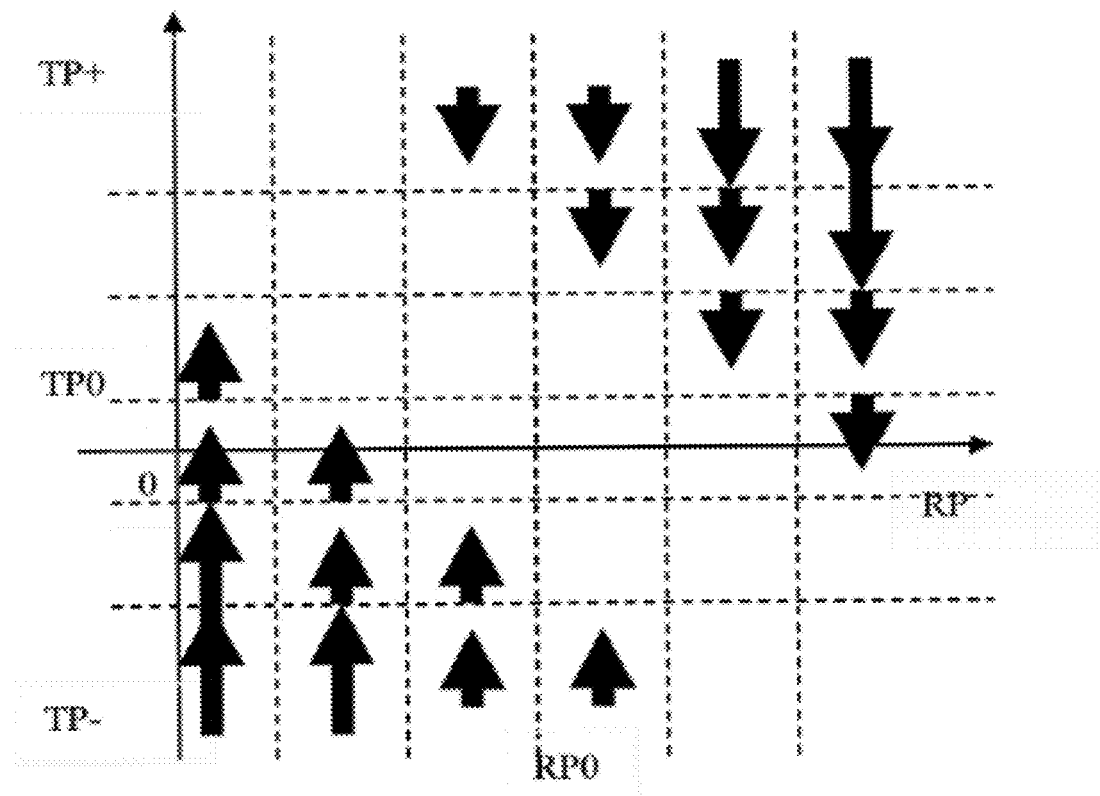
FIG. 8 shows an embodiment of another space dividing.

FIG. 8 shows another embodiment for dividing the two-dimensional TP-RP parameter space. In FIG. 8, a plane comprising the two-dimensional TP-RP parameter space is divided into several rectangular sections according to different RP parameter values and TP parameter values. A connection constraint model can be defined for each of the rectangular sections. The connection constraint model can be described as follows. Each of the sub-connections can fall into a certain section of the grid of FIG. 7 based on the values of the RP parameter and the TP parameter. If the TP parameter and RP parameter associated with a sub-connection is closer to a region at the upper-right corner of the two-dimensional TP-RP parameter space (of FIG. 7), the wiring width of the sub-connection can be made thinner and/or the sub-connection can be shifted to a lower level metal layer. If the TP parameter and RP parameter associated with a sub-connection is closer to a region at the lower-left corner of the two-dimensional TP-RP parameter space (of FIG. 7), the wiring width of the sub-connection can be made thicker and/or the sub-connection can be shifted to a higher level metal layer. The specific connection optimizing strategy defined for each section of the grid can be stored in a suitable data structure, including but not limited to table, array, or the like. It is noted that the method for defining the connection optimization strategy defined for each section of the grid can be flexible and can be independently configured based on specific design requirements.

Figure 9:
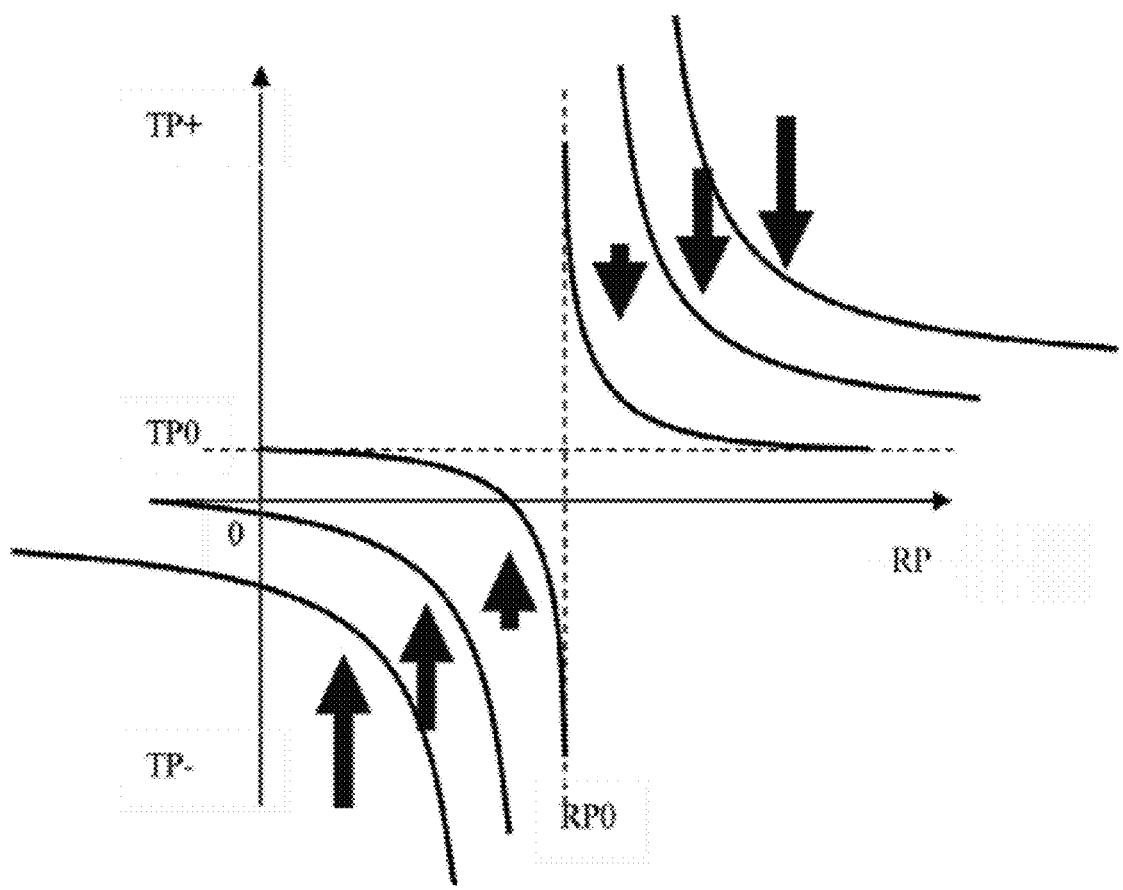
FIG. 9 shows an embodiment of a space dividing in which the number of regions in a RP-TP space division is increased.

In addition, based on the number of levels for adjusting line-width allowed by different processes (e.g., the number of allowable line widths, the number of allowable metal layers, etc.), the number of sections that constitute the RP-TP space can be varied accordingly. For example, if number of allowable line widths increases, the plurality of thresholds can be increased, accordingly the TP-RP parameter space can be divided into a larger number of sections, thereby increasing the accuracy of optimization, as shown in FIG. 9. Alternatively, the two-dimensional TP-RP parameter space divided into several rectangular sections can be further divided into smaller sections (e.g., to yield a more finely divided finer space) in which each block in the grid is smaller. If the TP parameter and RP parameter associated with a sub-connection is closer to a region at the upper-right corner of the two-dimensional TP-RP parameter space, the wiring width of the sub-connection can be made thinner and/or the sub-connection can be shifted to a lower level metal layer. If the TP parameter and RP parameter associated with a sub-connection is closer to a region at the lower-left corner of the two-dimensional TP-RP parameter space, the wiring width of the sub-connection can be made thicker and/or the sub-connection can be shifted to a higher level metal layer. It is noted that the optimizing strategy defined for each section of the grid can be stored in any suitable data structure including but not limited to table, array, or the like.

Figure 10:
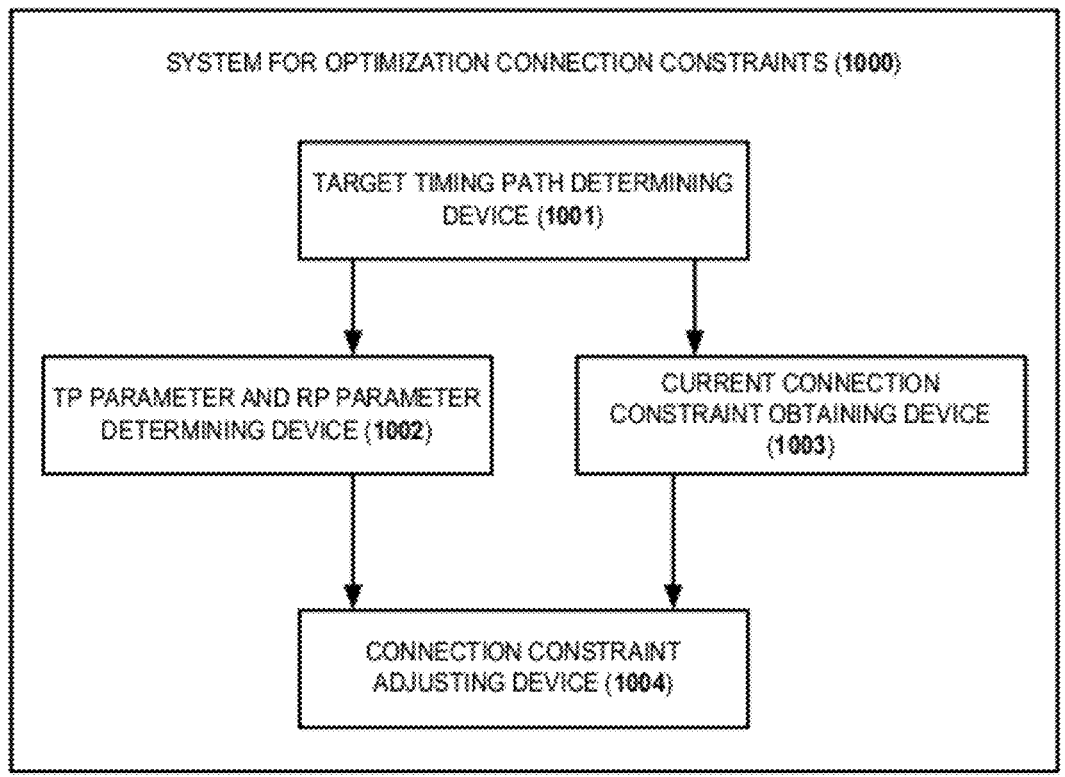
FIG. 10 shows a structural block diagram of a system for optimizing connection constraints in an IC design.

Embodiments also include a system for optimizing connection constraints in an IC design, which has a structure shown in FIG. 10. According to FIG. 10, the system 1000 comprises a target timing path determining device 1001 for determining, for at least one sub-connection of a connection, a target timing path of the sub-connection. System 1000 further comprises a TP parameter and RP parameter determining device 1002 for calculating TP parameter and RP parameter on the determined target timing path of the sub-connection. As described above, the TP parameter relates to a possibility that timing closure holds on the target timing path where the sub-connection is located, and the RP parameter relates to a possibility that a physical routing track passing on the target timing path where the sub-connection is located resolves a congestion problem. The system 1000 further comprises a current connection constraint obtaining device 1003 configured to determine a current connection constraint set for the sub-connection by an existing IC design tool. The system 1000 also comprises a connection constraint adjusting device 1004 for adjusting the current connection constraint of the sub-connection according to different connection constraint models set based on the positions of the TP parameter and the RP parameter of the sub-connection in a two-dimensional TP-RP parameter space.

In some embodiments, the target timing path determining device 1001 can comprise a device configured to obtain all the timing paths of the sub-line (or sub-connection), a device configured to algebraically add closure degrees of all the current connecting points on each timing path of the obtained sub-line to obtain a closure degree value of each timing path, and a device configured to select the timing path with a minimum closure degree value of timing path as the target timing path of the sub-line. In some embodiments, the system 1001 can further comprise a congestion region dividing device (not shown in FIG. 10) configured to divide the congestion region through which the sub-connection passes into grids with a predetermined size before calculating the RP parameter. As described above, each of the blocks within the grid can be associated with a congestion degree according to the number of routings passing through the blocks.

After the target timing path determining device 1001 determines the target timing path of the sub-line, the value of the TP parameter can be determined in the TP parameter and RP parameter determining device 1002 using and suitable techniques. In one example, the value of setup check timing closure degree on the determined target timing path of the sub-connection can be used as the value of the TP parameter of the sub-connection. As another example, the weighted average of the value of setup check timing closure degree on the determined target timing path of the sub-connection and the value of hold check timing closure degree can be selected as the value of the TP parameter. As another example, the sum of the value of setup check timing closure degree on the determined target timing path of the sub-connection and the reciprocal of a logical level on the target timing path can be used as the value of the TP parameter. As another example, the variation of late time and early time on the determined target timing path of the sub-connection can be selected as the value of the TP parameter.

After the target timing path determining 1001 determines the target timing path of the sub-line and the congestion region dividing device divides congestion regions, the TP parameter and RP parameter determining device 1002 determines the value of the RP parameter by using any suitable techniques. In one example, the value of the RP parameter of the sub-connection can be determined as the squared difference of congestion degrees of blocks (within the congestion grid through which the sub-connection passes) with congestion values that are greater than a predetermined threshold. As another example, the congestion value of the most congested block through which the sub-connection passes can be selected as the value of the RP parameter of the sub-connection. As another example, the sum of congestion values of blocks contained in a rectangle with an input terminal and an output terminal through which the sub-connection passes as vertices can be selected as the value of the RP parameter of the sub-connection.

In embodiments, the two-dimensional space constituted by TP parameters and RP parameters can be divided into different sections. In one embodiment, the two-dimensional TP-RP parameter space can be divided into different sections using hyperbolas. In another embodiment, the two-dimensional TP-RP parameter space can be divided into several rectangular sections according to the difference of the RP and TP parameter values. The number of regions into which the TP-RP parameter space is divided can be further increased based on the number of allowable line widths (e.g., allowed by different processes). In some implementations, the connection constraint adjusting device 1004 can modify the current connection constraints of the sub-connection. If the TP parameter and the RP parameter of the sub-connection are closer to a region at the upper-right corner of the two-dimensional TP-RP parameter space, the sub-connection can be made thinner and/or the sub-connection can be implemented on a lower level metal layer. If the TP parameter and the RP parameter of the sub-connection are closer to a region at the lower-left corner of the two-dimensional TP-RP parameter space, the sub-connection can be made thicker and/or the sub-connection can be implemented on a higher level metal layer.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for optimizing connection constraints in an integrated circuit design as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

Although example embodiments are described by referring to the attached drawings herein, it would be understood that the present invention is not limited to these exact embodiments, and various changes and modifications can be made to the embodiments by those of ordinary skill in the art without departing from the scope and purpose of the inventive subject matter. All of these changes and modifications intend to be included in the scope of the inventive subject matter defined in the attached claims.

What is claimed is:

1. A method for optimizing connection constraints in an integrated circuit (IC) design, comprising:
    determining a target timing path associated with a first of a plurality of sub-connections of the integrated circuit, wherein the first of the plurality of sub-connections is associated with a current connection constraint set;
    determining a timing probability value associated with the first of the plurality of sub-connections based, at least in part, on the target timing path associated with the first of the plurality of sub-connections, wherein the timing probability value indicates a probability that timing closure is satisfied on the target timing path associated with the first of the plurality of sub-connections;
    determining a route probability value associated with the first of the plurality of sub-connections based, at least in part, on the target timing path associated with the first of the plurality of sub-connections, wherein the route probability value indicates a probability that a physical routing track on the target timing path associated with the first of the plurality of sub-connections resolves congestion;
    identifying a connection constraint model to which the first of the plurality of sub-connections corresponds based, at least in part, on the timing probability value associated with the first of the plurality of sub-connections and the route probability value associated with the first of the plurality of sub-connections; and
    modifying, by a processor, the current connection constraint associated with the first of the plurality of sub-connections in accordance with the connection constraint model to which the first of the plurality of sub-connections corresponds.

2. The method of claim 1, wherein said determining the target timing path associated with the first of the plurality of sub-connections comprises:
    determining one or more timing paths associated with the first of the plurality of sub-connections, wherein each of the one or more timing paths comprise a subset of the plurality of sub-connections between a source component and a destination component of the integrated circuit, wherein each of the one or more timing paths comprises the first of the plurality of sub-connections;
    for each of the one or more timing paths;
        determining the subset of sub-connections including the first of the plurality of sub-connections of the timing path;
        determining a timing closure degree associated with each sub-connection of the subset of sub-connections;
        combining the timing closure degree associated with each sub-connection of the subset of sub-connections to yield a timing closure degree associated with the timing path;
    comparing the timing closure degrees associated with each of the one or more timing paths to determine that a first of the one or more timing paths is associated with the smallest timing closure degree; and
    designating the first of the one or more timing paths is associated with the smallest timing closure degree as the target timing path associated with the first of the plurality of sub-connections.

3. The method of claim 2, wherein said determining the timing closure degree associated with each sub-connection of the subset of sub-connections comprises:
    for sub-connection of the subset of sub-connections,
    determining an requisite arrival time associated with the sub-connection and an actual arrival time associated with the sub-connection; and
    subtracting the actual arrival time from the requisite arrival time to determine the timing closure degree associated with the sub-connection.

4. The method of claim 1, wherein said determining the timing probability value associated with the first of the plurality of sub-connections comprises at least one of:
    designating the setup slack value of the target timing path associated with the first of the plurality of sub-connections as the timing probability value associated with the first of the plurality of sub-connections, wherein the setup slack value of the target timing path associated with the first of the plurality of sub-connections is a first combination of a clock period associated with the first of the plurality of sub-connections, a data arrival time on the target timing path, and a guard time interval;
    determining the timing probability value associated with the first of the plurality of sub-connections as a weighted average of the setup slack value and a hold slack value, wherein the hold slack value of the target timing path associated with the first of the plurality of sub-connections is a second combination of the clock period associated with the first of the plurality of sub-connections, the data arrival time on the target timing path, and the guard time interval;
    determining the timing probability value associated with the first of the plurality of sub-connections as a weighted combination of the setup slack value and a reciprocal of a logical level that comprises the target timing path; and
    determining the timing probability value associated with the first of the plurality of sub-connections as a difference between a maximum arrival time associated with the target timing path and a minimum arrival time associated with the target timing path.

5. The method of claim 1, wherein prior to said determining the route probability value associated with the first of the plurality of sub-connections, the method further comprises:
identifying a congestion region through which the first of the plurality of sub-connections passes, wherein the congestion region is a segment of the integrated circuit through which at least a predetermined number of the plurality of sub-connections including the first of the plurality of sub-connections pass;
dividing the congestion region into a plurality of sub-regions; and
determining a congestion degree value for each of the plurality of sub-regions based, at least in part, on a number of the plurality of sub-connections that pass through the sub-region.

6. The method of claim 5, wherein said determining the route probability value associated with the first of the plurality of sub-connections comprises:
identifying one or more of the plurality of sub-regions through which the first of the plurality of sub-connections passes and which are associated with a congestion degree value that is greater than a threshold congestion degree value;
for each of the one or more of the plurality of sub-regions, calculating a difference between the congestion degree value of the sub-region and the threshold congestion degree value; and
determining the route probability value associated with the first of the plurality of sub-connections as a sum, across the one or more sub-regions, of the squares of the difference between the congestion degree value of the sub-region and the threshold congestion degree value.

7. The method of claim 5, wherein said determining the route probability value associated with the first of the plurality of sub-connections comprises:
identifying one or more of the plurality of sub-regions through which the first of the plurality of sub-connections passes;
comparing the congestion degree values associated with the one or more of the plurality of sub-regions to determine that a first of the one or more of the plurality of sub-regions is associated with the highest congestion degree value; and
designating first of the one or more of the plurality of sub-regions is associated with the highest congestion degree value as the route probability value associated with the first of the plurality of sub-connections.

8. The method of claim 7, wherein said determining the route probability value associated with the first of the plurality of sub-connections comprises:
identifying one or more of the plurality of sub-regions that comprise the first of the plurality of sub-connections, an input terminal of the first of the plurality of sub-connections, and an output terminal of the first of the plurality of sub-connections; and
determining the route probability value associated with the first of the plurality of sub-connections as a sum of the congestion degree values associated with each of the one or more sub-regions.

9. The method of claim 1, wherein said identifying the connection constraint model to which the first of the plurality of sub-connections corresponds comprises:
determining a two-dimensional parameter space based on the timing probability value and the route probability value; and
dividing the two dimensional parameter space into a plurality of sections, wherein each of the plurality of sections is associated with corresponding ones of a plurality of sub-connection categories of the connection constraint model.

10. The method of claim 9, wherein the plurality of sub-connection categories indicates whether:
the first of the plurality of sub-connections is timing critical and passes through a congestion region of the integrated circuit,
the first of the plurality of sub-connections is timing critical and does not pass through a congestion region of the integrated circuit,
the first of the plurality of sub-connections is not timing critical and passes through a congestion region of the integrated circuit, or
the first of the plurality of sub-connections is not timing critical and does not pass through a congestion region of the integrated circuit.

11. The method of claim 9, further comprising:
varying a number of the plurality of sections of the two-dimensional parameter space based on one or more of a number of allowable sub-connection widths, a number of allowable metal layers of the integrated circuit, and a process associated with the integrated circuit.

12. The method of claim 9, wherein said identifying the connection constraint model to which the first of the plurality of sub-connections corresponds comprises:
determining that the first of the plurality of sub-connections corresponds to a first of the plurality of sub-connection categories based, at least in part, on the timing probability value associated with the first of the plurality of sub-connections and the route probability value associated with the first of the plurality of sub-connections.

13. The method of claim 12, wherein said modifying the current connection constraint associated with the first of the plurality of sub-connections in accordance with the connection constraint model to which the first of the plurality of sub-connections corresponds comprises:
determining, based on one or more of the timing probability value, the route probability value, and the first of the plurality of sub-connection categories, that the first of the plurality of sub-connections corresponds to a first of the plurality of sections of the two dimensional parameter space;
in response to said determining that the first of the plurality of sub-connections corresponds to the first of the plurality of sections, the method comprises one of:
decreasing a width of the first of the plurality of sub-connections or implementing the first of the plurality of sub-connections on a lower metal layer of the integrated circuit, and
increasing a width of the first of the plurality of sub-connections or implementing the first of the plurality of sub-connections on a higher metal layer of the integrated circuit.

14. A computer program product for optimizing connection constraints in an integrated circuit (IC) design, the computer program product comprising:
a non-transitory computer readable storage medium having computer usable program code embodied therewith, the computer usable program code configured to:
determine a target timing path associated with a first of a plurality of sub-connections of the integrated circuit, wherein the first of the plurality of sub-connections is associated with a current connection constraint set;

determine a timing probability value associated with the first of the plurality of sub-connections based, at least in part, on the target timing path associated with the first of the plurality of sub-connections, wherein the timing probability value indicates a probability that timing closure is satisfied on the target timing path associated with the first of the plurality of sub-connections;

determine a route probability value associated with the first of the plurality of sub-connections based, at least in part, on the target timing path associated with the first of the plurality of sub-connections, wherein the route probability value indicates a probability that a physical routing track on the target timing path associated with the first of the plurality of sub-connections resolves congestion;

identify a connection constraint model to which the first of the plurality of sub-connections corresponds based, at least in part, on the timing probability value associated with the first of the plurality of sub-connections and the route probability value associated with the first of the plurality of sub-connections; and modify the current connection constraint associated with the first of the plurality of sub-connections in accordance with the connection constraint model to which the first of the plurality of sub-connections corresponds.

15. The computer program product of claim 14, wherein the computer usable program code configured to determine the target timing path associated with the first of the plurality of sub-connections comprises the computer usable program code configured to:

determine one or more timing paths associated with the first of the plurality of sub-connections, wherein each of the one or more timing paths comprise a subset of the plurality of sub-connections between a source component and a destination component of the integrated circuit, wherein each of the one or more timing paths comprises the first of the plurality of sub-connections;

for each of the one or more timing paths;
  determine the subset of sub-connections including the first of the plurality of sub-connections of the timing path;
  determine a timing closure degree associated with each sub-connection of the subset of sub-connections;
  combine the timing closure degree associated with each sub-connection of the subset of sub-connections to yield a timing closure degree associated with the timing path;

compare the timing closure degrees associated with each of the one or more timing paths to determine that a first of the one or more timing paths is associated with the smallest timing closure degree; and designate the first of the one or more timing paths is associated with the smallest timing closure degree as the target timing path associated with the first of the plurality of sub-connections.

16. The computer program product of claim 14, wherein the computer usable program code configured to determine the timing probability value associated with the first of the plurality of sub-connections comprises at least one of:

the computer usable program code configured to designate the setup slack value of the target timing path associated with the first of the plurality of sub-connections as the timing probability value associated with the first of the plurality of sub-connections, wherein the setup slack value of the target timing path associated with the first of the plurality of sub-connections is a first combination of a clock period associated with the first of the plurality of sub-connections, a data arrival time on the target timing path, and a guard time interval;

the computer usable program code configured to determine the timing probability value associated with the first of the plurality of sub-connections as a weighted average of the setup slack value and a hold slack value, wherein the hold slack value of the target timing path associated with the first of the plurality of sub-connections is a second combination of the clock period associated with the first of the plurality of sub-connections, the data arrival time on the target timing path, and the guard time interval;

the computer usable program code configured to determine the timing probability value associated with the first of the plurality of sub-connections as a weighted combination of the setup slack value and a reciprocal of a logical level that comprises the target timing path; and the computer usable program code configured to determine the timing probability value associated with the first of the plurality of sub-connections as a difference between a maximum arrival time associated with the target timing path and a minimum arrival time associated with the target timing path.

17. The computer program product of claim 14, wherein prior to the computer usable program code determining the route probability value associated with the first of the plurality of sub-connections, the computer usable program code is configured to:

identify a congestion region through which the first of the plurality of sub-connections passes, wherein the congestion region is a segment of the integrated circuit through which at least a predetermined number of the plurality of sub-connections including the first of the plurality of sub-connections pass;

divide the congestion region into a plurality of sub-regions; and determine a congestion degree value for each of the plurality of sub-regions based, at least in part, on a number of the plurality of sub-connections that pass through the sub-region, wherein the computer usable program code configured to determine the route probability value associated with the first of the plurality of sub-connections comprises the computer usable program code configured to:

identify one or more of the plurality of sub-regions through which the first of the plurality of sub-connections passes and which are associated with a congestion degree value that is greater than a threshold congestion degree value;

for each of the one or more of the plurality of sub-regions, calculate a difference between the congestion degree value of the sub-region and the threshold congestion degree value; and determine the route probability value associated with the first of the plurality of sub-connections as a sum, across the one or more sub-regions, of the squares of the difference between the congestion degree value of the sub-region and the threshold congestion degree value.

18. An apparatus for optimizing connection constraints in an integrated circuit (IC) design comprising:
a processor;
a connection constraint optimization unit coupled with the processor, the connection constraint optimization unit operable to:

determine a target timing path associated with a first of a plurality of sub-connections of the integrated circuit, wherein the first of the plurality of sub-connections is associated with a current connection constraint set;

determine a timing probability value associated with the first of the plurality of sub-connections based, at least in part, on the target timing path associated with the first of the plurality of sub-connections, wherein the timing probability value indicates a probability that timing closure is satisfied on the target timing path associated with the first of the plurality of sub-connections;

determine a route probability value associated with the first of the plurality of sub-connections based, at least in part, on the target timing path associated with the first of the plurality of sub-connections, wherein the route probability value indicates a probability that a physical routing track on the target timing path associated with the first of the plurality of sub-connections resolves congestion;

identify a connection constraint model to which the first of the plurality of sub-connections corresponds based, at least in part, on the timing probability value associated with the first of the plurality of sub-connections and the route probability value associated with the first of the plurality of sub-connections; and modify the current connection constraint associated with the first of the plurality of sub-connections in accordance with the connection constraint model to which the first of the plurality of sub-connections corresponds.

19. The apparatus of claim 18, wherein the connection constraint optimization unit configured to determine the target timing path associated with the first of the plurality of sub-connections comprises the connection constraint optimization unit configured to:

determine one or more timing paths associated with the first of the plurality of sub-connections, wherein each of the one or more timing paths comprise a subset of the plurality of sub-connections between a source component and a destination component of the integrated circuit, wherein each of the one or more timing paths comprises the first of the plurality of sub-connections;

for each of the one or more timing paths;
  determine the subset of sub-connections including the first of the plurality of sub-connections of the timing path;
  determine a timing closure degree associated with each sub-connection of the subset of sub-connections;
  combine the timing closure degree associated with each sub-connection of the subset of sub-connections to yield a timing closure degree associated with the timing path;

compare the timing closure degrees associated with each of the one or more timing paths to determine that a first of the one or more timing paths is associated with the smallest timing closure degree; and designate the first of the one or more timing paths is associated with the smallest timing closure degree as the target timing path associated with the first of the plurality of sub-connections.

20. The apparatus of claim 18, wherein the connection constraint optimization unit comprises a computer readable storage medium.

* * * * *